Dec. 26, 1967  B. AINLEY  3,360,699
TRIMMER CAPACITORS
Filed April 4, 1966

INVENTOR:
BRIAN AINLEY.
BY
ATTORNEY,

United States Patent Office 3,360,699
Patented Dec. 26, 1967

3,360,699
TRIMMER CAPACITORS
Brian Ainley, Ulverston, England, assignor to Oxley Developments Company Limited, Ulverston, England, a British company
Filed Apr. 4, 1966, Ser. No. 539,911
Claims priority, application Great Britain, Apr. 29, 1965, 17,991/65
1 Claim. (Cl. 317—253)

ABSTRACT OF THE DISCLOSURE

A rotary capacitor is provided with the stator and rotor each formed of a single piece and with mounting means to place the capacitor on a printed circuit.

The present invention relates to variable capacitors and in particular to miniature adjustable trimmer capacitors in which the electrodes are each formed from single pieces of metal, for example by machining, as described in British patent specification No. 825,656, and which are adapted for fitting on printed circuit boards and the like.

It has hitherto been proposed to manufacture trimmer capacitors of the type described in which the stator electrode is secured at one end to an insulating base formed from a ceramic material and in which the rotor is supported by only one bearing formed in this ceramic base. A ceramic material is preferred because of its very high resistance to the flow of electric currents, but such material is very brittle and using conventional ceramic manufacturing processes it is difficult to obtain the high degree of accuracy required in the manufacture of small tolerance trimmer capacitors. The present invention therefore seeks to provide a trimmer capacitor which is adapted for connection to a printed circuit board or the like, and in which the stator and rotor are both machined from solid metal, and wherein the use of ceramic materials is not essential in its manufacture.

According to the present invention in a trimmer capacitor having a stator and a rotor both of which are formed from single pieces of metal, the rotor is insulatedly supported at each end in bearings housed at opposite ends of the stator.

Preferably each bearing comprises a generally cylindrical bush of electrically insulating material having a cylindrical through bore and the rotor is extended at each end to form axially aligned stub shafts which are a close slipping fit in the through bores. Conveniently the stator is formed with two end plates each having a semi-circular recess for receiving the lower half of one of the bearings, and each bearing is sandwiched between a stator end plate and a bridge member, which latter is securable to an end plate, and is formed with a corresponding semi-circular recess to receive the upper half of the bearing.

Conveniently each bridge member is made from electrically insulating material, and is securable to a stator end plate by means of two pins which pass through holes in the bridge member, each pin having a threaded portion at one end to engage in a correspondingly threaded hole in the end plate, and extending in the opposite direction to form a stator terminal support whereby the trimmer capacitor may be mounted on a printed circuit board or the like.

In addition a contact member, which contacts the rotor at one end, passes through a passage in one of the bridge members, and extends upwardly between two of the stator terminals to form a rotor terminal.

Figure 1:
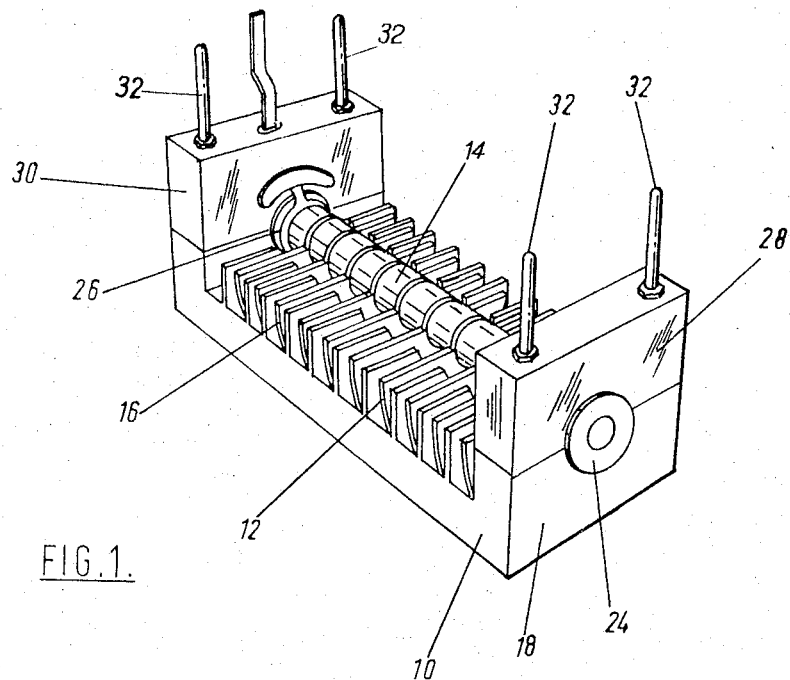
Figure 2:
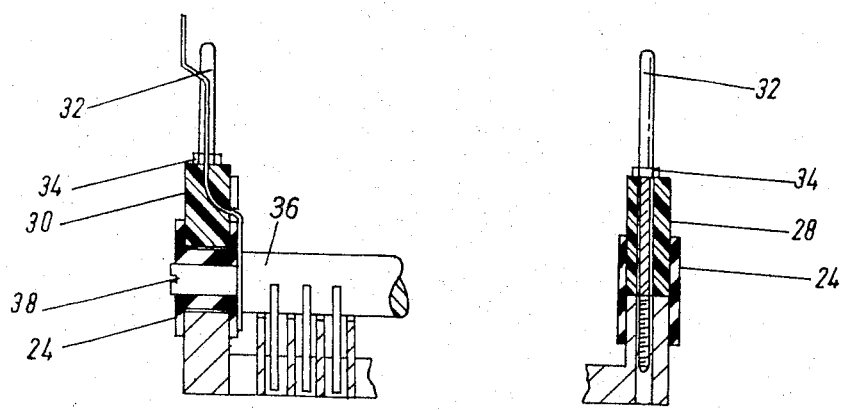
Figure 3:
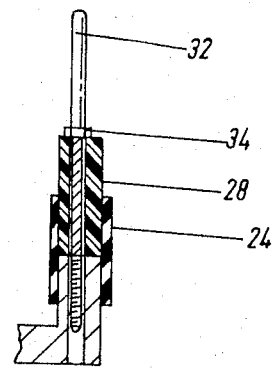
Figure 4:
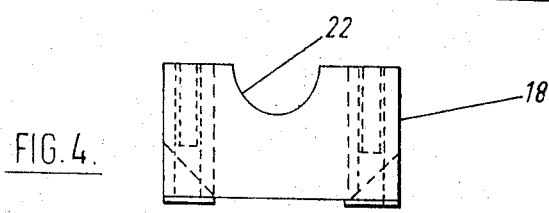

The invention will now be described further by way of example with reference to the accompanying drawing, in which:

FIG. 1 is a perspective view of a trimmer capacitor constructed to include the preferred features of the invention, FIG. 2 is a fragmentary view of the end of the trimmer of FIG. 1 containing the rotor contact arm and sectioned on the vertical plane which passes through the rotor axis, FIG. 3 is a fragmentary view of one end of the same trimmer, sectioned on a vertical plane through one of the pins and illustrates the method of securing the bridge member to the stator, and FIG. 4 is an end view of the stator, and illustrates the semi-circular groove formed in its upper surface.

Referring now to FIG. 1 a trimmer capacitor constructed in accordance with the invention comprises a stator 10, having stator plates 12 and a rotor 14 having rotor plates 16 the rotor and stator each being machined from the solid metal in the manner described in British patent specification No. 825,656.

The stator 10 comprises a substantially rectangular frame, having block portions 18 and 20 formed one at each end, each block portion having a semi-circular slot formed in its upper surface as illustrated at 22 in FIG. 4.

Two bridge members 28, 30 are mounted, one at each end of the stator 10, in abutting relation with the stator block portions, and that face of each bridge member which abuts the stator block portion is provided with a semi-circular slot corresponding to the slot 22. Each bridge member is secured to the stator block portion by means of two pins 32. The lower portion of each pin is threaded, and as illustrated in FIG. 3 of the drawings, holes having a corresponding thread are provided in the stator block portion 18, 20, to receive the threaded portion of each pin. Holes are provided in each bridge member through which the shank of each pin can pass, and each pin is formed with a radial abutment 34 in the form of a hexagonal nut, whereby the pin may be rotated by means of a spanner or similar tool and tightened down against the bridge member, to thereby secure this member in abutting relation against the stator block portion.

The rotor 14 has a central cylindrical shaft portion which extends at each end, with reduced diameter, as shown in detail at 36 in FIG. 2. Each shaft extension 36, passes through the through bore of a cylindrical bearing bush 24, which fits in the circular hole formed between a bridge member and a stator block portion. Each bush 24 has two radial flanges as shown in FIG. 2 and axial movement of the bush is thereby prevented. The bush 24 is made from electrically insulating material such as a synthetic resin. In the preferred embodiment this material is P.T.F.E.

Electrical contact is made with the rotor by means of a rotor arm 26, which is adapted to fit around the rotor shaft extension 36. When in position it is gripped between the radial shoulder of the rotor shaft and the end face of a bearing bush 24. The contact arm 26 extends upward through a passage formed in the bridge member, to emerge mid-way between the two pins 32.

One end of the rotor shaft is provided with a diametral slot 38. The position of the rotor relative to the stator may be varied, by placing the blade of a screw-driver, or similar tool, into this slot and rotating the screw-driver.

I claim:
A trimmer capacitor comprising, in combination:
a stator,
a rotor, said stator and rotor each being formed from a single piece of metal,
two plates formed integrally with and defining opposite ends of the stator, each plate being in part cut-away along its upper edge to define a semi-circular recess,
a spindle formed integrally with the rotor to extend be- yond the ends of the rotor to form coaxial stub shafts, two bridge members for securing to the two end plates of the stator in contact with the upper edges thereof, each bridge member being formed from electrically insulating material and being in part cut-away along the edge in contact with the end plate, to define a semi-circular recess complementary to that in the end plate, to thereby define a circular aperture at each end of the stator, two bearings of electrically insulating material housed in said circular aperture to receive as a close slipping fit the two stub shafts of the rotor, each bearing having a central cylindrical section for positioning in the aperture and two end flanges of greater diameter to retain the bearing in the aperture, conductive pins for securing the bridge members to the stator end plates, the pins extending through the bridge members to form stator terminals, and a conductive contact member in electrical contact with the rotor at one end and extending through and terminating beyond one of the bridge members to form a rotor terminal at its other end.

References Cited

UNITED STATES PATENTS

| | | | |
|---|---|---|---|
| 1,995,669 | 3/1935 | Cohen | 317—254 |
| 2,884,283 | 4/1959 | Korol. | |
| 3,129,364 | 4/1964 | Oxley | 317—253 |

FOREIGN PATENTS 1,258,442  3/1961  France.

LEWIS H. MYERS, *Primary Examiner.*

E. GOLDBERG, *Assistant Examiner.*